United States Patent Office 3,162,683
Patented Dec. 22, 1964

3,162,683
LIQUID PHASE OXIDATION OF ALKYL-SUBSTITUTED AROMATICS
Jennings H. Jones and Merrell R. Fenske, State College, Pa., assignors to Esso Research and Engineering Company, a corporation of Delaware
No Drawing. Filed June 23, 1959, Ser. No. 822,208
14 Claims. (Cl. 260—524)

The invention relates to a process for the catalytic oxidation of organic compounds. Specifically, the invention is directed to the oxidation of dialkyl substituted aromatic compounds with molecular oxygen in the presence of a halogenated organic acid. In one aspect it concerns the oxidation of substituted aromatic compounds to produce aromatic carboxylic acids.

Heretofore, oxygenated aromatic compounds have been prepared in relatively low yields by the catalytic oxidation of alkyl substituted aryl compounds by means of gaseous oxygen in the presence of a metal catalyst, such as cobalt. The oxidation, which is generally carried out in the presence of acetic acid, yields a variety of oxygenated products which include some acids and carbonyl-containing substances.

It has now been discovered that the oxidation of substituted aromatic compounds can be controlled and regulated by the use of halogenated organic acids containing 2 to 8 carbon atoms. These halogenated acids when used in combination with a lower aliphatic monocarboxylic acid having 2 to 8 carbon atoms, such as acetic acid, promote the formation of carboxylic acids when alkyl, dialkyl or polyalkyl substituted aromatic compounds are oxidized with molecular oxygen. By regulating the reaction conditions set forth hereinafter it is possible to produce not only carboxylic acids but also other oxygen-containing aromatic compounds. Non-acidic oxygenated organic compounds such as aldehydes, ketones, lactones and alcohols are preferentially produced by employing milder conditions, i.e. temperature and pressure, and ionic bromine with a small amount of perhalogenated organic acid.

In practicing the present invention, the oxidation of substituted aromatic compounds, especially alkyl-substituted aromatic compounds, is effected by reacting said compounds with molecular oxygen, e.g. air, in the presence of a perhalogenated organic mono- or di-carboxylic acid and catalytic amounts of a heavy metal-containing substance. The oxidation reaction should be carried out under atmospheric or superatmospheric pressure, e.g. up to 1000 p.s.i.g., at temperatures that are high enough to cause the desired selective oxidation to take place. It has been found that temperatures in the range of 100 to 200° C., and preferably 110 to 150° C., may be employed for most reactions, although lower temperatures, e.g. 75° C., can be used in certain reactions. The reaction time should be sufficiently long to convert a substantial proportion of the substituted aromatic material to the desired oxygenated derivative, e.g. carboxylic acid. While reaction times of up to 50 hours may be employed, most of the oxidation reactions will give practical yields in 0.5 to 10 hours.

The catalysts that are most effective in this novel process are those which contain metals selected from Groups VIB, VIIB and VIII of the "Periodic Chart of Elements" on pages 342 and 343 of the Handbook of Chemistry and Physics, 33rd edition, published by Handbook Publishers, Inc., Cleveland, Ohio. It is preferred to use metal salts of organic acids, e.g. $C_2$ to $C_8$ acids, or inorganic salts, such as phosphates, sulfates, chromates, manganates and halides. Among the catalysts which may be employed are cobalt acetate, cobaltous bromide, manganese bromide, manganese acetate, cobalt naphthenate, nickel acetylacetonate, cupric acetate, cuprous bromide, iron acetate, palladium acetate, palladium chloride and platinic chloride.

It is preferred to carry out the oxidation in an acid medium comprising a mixture of a lower aliphatic monocarboxylic acid and a perhalogenated lower aliphatic carboxylic acid. The weight ratio of aliphatic monocarboxylic acid to perhalogenated acid should be between 100:1 to 5:1, it being most advantageous to use a weight ratio of 15:1 to 25:1. The non-halogenated aliphatic monocarboxylic acids which are most useful in the oxidation of substituted aromatic compounds are the $C_2$ to $C_4$ acids, such as acetic acid, propionic acid and butyric acid. The perhalogenated aliphatic carboxylic acids are preferably perfluoro, perchloro and perchlorofluorocarboxylic acids. These acids have only halogen atoms attached to the carbon atoms, other than the carbon which is part of the carboxyl group. The $C_3$ to $C_6$ acids having all of the hydrogen atoms of the alkyl radical replaced by halogen atoms are especially preferred. Among the preferred monobasic and dibasic acids are dichloropentafluorobutyric acid, trichlorooctafluorohexanoic acid, perfluoropropionic acid, perfluoroacetic acid, perfluorosuccinic acid, perfluorobutyric acid, and perfluoroglutaric acid. The monobasic acids have the generic formula:

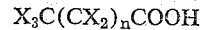
$$X_3C(CX_2)_nCOOH$$

wherein $n=1$ to 6 or 8, and X is either fluorine or a mixture of fluorine and chlorine; the dibasic acids have the generic formula:

$$HOOC(CX_2)_nCOOH$$

wherein $n=1$ to 6 or 8, and X is either fluorine or a mixture of fluorine and chlorine. The most effective prehalogenated acids are those which contain at least 70 weight percent fluorine. Among the commercially available perchlorofluorocarboxylic acids which are highly suitable for the purposes of the present invention are the Kel-F acids (a tradename of M. W. Kellogg Company), e.g. Kel-F Acid 683 which is trichlorooctafluorohexanoic acid and the Kel-F Acid 8114 which is tetrachloroundecafluorooctanoic acid.

While it is not necessary to have ionic bromine in the reaction mixture, it has been noted that the reaction time is generally shorter when for instance hydrobromic acid is present during the oxidation reaction. Thus, if a higher reaction rate is desired, a small quantity of a 40–45 weight percent hydrobromic acid solution should be added to the oxidation reactants. It is believed that ionic bromine enhances the catalytic activity of the perhalogenated acids and therefore strongly affects the oxidation of substituted aromatic compounds. Furthermore, the combination of a perfluorinated acid and ionic bromine leads to products that are somewhat different from those obtained when using either a perhalogenated acid or a bromine compound alone.

The amount of aliphatic monocarboxylic acid, e.g. glacial acetic acid, used in the reaction is generally in the range of 2 to 10 parts by weight per part of aromatic material. The quantity of ionic bromine, when used, may vary between 0.1 and 0.3 part by weight per part of aromatic material. Insofar as the perhaloacids are concerned, they should be present in an amount of 0.1 to 0.4 part by weight per part of aromatic material and preferably about 0.2 to 0.3 part by weight per part of said material.

The oxidizing agent used may be substantially 100% oxygen gas or it may be in a gaseous mixture, such as air. The ratio of oxygen fed into the reaction mixture relative to the aromatic hydrocarbon feed should be in the range about 2 to 500 moles of oxygen per mole of aromatic, and preferably about 5 to 75 moles of oxygen per mole of feed.

The process should be conducted under essentially liquid phase conditions, the liquid phase being maintained by regulating the temperature and pressure in the reaction zone. This pressure may be as high as 1000 p.s.i.g., although it is preferred for economic reasons to operate in the range of atmospheric or relatively low pressure, e.g. up to 200 p.s.i.g. The liquid phase oxidation process may be conducted on a continuous, intermittent, or batch basis. Any water and/or other low boiling side products which are formed during the reaction may be removed by suitable means, such as distillation.

The substituted aromatic compounds which are oxidized in accordance with the invention may contain one or more aromatic nuclei and preferably are polyalkyl substituted benzene compounds. Among the feeds that are suitable for the present invention are hydrocarbon streams containing substantial amounts of ortho, meta, or para-dimethylbenzene, diethylbenzene, di-n-propylbenzene, diisopropylbenzene, di-n-butylbenzene, tri- and tetra-methylbenzenes, toluene, ethylbenzene and isopropylbenzene. The alkyl group attached to the aromatic nucleus may contain from 1 to 4 carbon atoms, although it is usually preferred to use methyl substituted benzenes as the feed for the reaction because they are the most readily available.

The oxidations may be carried out to produce either a major proportion of the corresponding monocarboxylic acid, a mixture of mono and dicarboxylic acids, or other selected products depending on the conditions employed. For instance when para-xylene is oxidized at 150° C. (50 p.s.i.g.) with air in the absence of bromine ion but in the presence of perfluorobutyric acid and cobalt acetate, the product consists of a mixture of solid acids composed of terephthalic acid (30%), p-toluic acid (50%) and terephthaldehydic acid (20%). The aldehydic acid may be further oxidized to give an additional quantity of terephthalic acid. If para-xylene is oxidized with air at 150° C. (50 p.s.i.g.) in the presence of cobalt acetate, hydrobromic acid, and perfluorobutyric acid the product consists of a mixture of 49% of solid acids (para-toluic and terephthalic acid) and 51% of para-tolualdehyde. From this it can be seen that at the higher temperature bromine favors the formation of aromatic aldehydes. When para-xylene is oxidized in exactly the same way (in the absence of bromine ion) except that the temperature is maintained at 110-114° C. (atmos. pressure) the product consists of p-toluic acid (90%), terephthalic acid (3%) and p-hydroxymethylbenzoic acid. Repeating the reaction in the presence of hydrogen bromide as well as perfluorobutyric acid and cobalt acetate, the products obtained are essentially similar in composition. Thus the presence of ionic bromine is not essential to carry out the reaction and it may or may not be employed, depending upon the reaction temperature and the particular products desired.

In a similar manner, ortho-xylene upon oxidation at atmospheric pressure and a temperature of about 110° C. in the presence of perfluorobutyric acid and cobalt acetate gives a product composed of 79% of ortho-toluic acid and 16% of phthalide. When the oxidation is carried out in the presence of perfluorobutyric acid and hydrogen bromide, the product consists of 40% ortho-toluic acid, 13% phthalide, the remainder being a mixture of orthotolualdehyde and the acetate of ortho-hydroxymethyltoluene. Again, it will be noted that the bromine ion affects the reaction.

The aromatic carboxylic acids prepared in accordance with the invention may be used as modifying agents for alkyd resins, as starting materials for the preparation of polyester fibers, plasticizers, synthetic lubricants, and when alkylated with a $C_{12}$ to $C_{14}$ olefin, as detergents or wetting agents.

The following examples serve to specifically illustrate how the process may be carried out:

EXAMPLE 1

A comparison was made to show the beneficial effects produced by the use of perfluorobutyric acid in combination with glacial acetic acid (99.8% pure) in the oxidation of ortho-xylene. In each run the specified amount of cobalt diacetate was dissolved in glacial acetic acid, and the hydrogen bromide (when used) and ortho-xylene were added to the glacial acetic acid solution. The resulting homogeneous solution was charged to the reaction vessel and air was introduced to the reaction vessel through a tube having a sintered-glass dispersion disc and means to prevent back-up of the liquid into the tube. Heat was applied to the reaction vessel and when the mixture began to boil the air rate was increased until the rate was 10 liters per hour. After permitting the reaction to proceed for the designated time, the application of heat was discontinued and the air rate was decreased to the minimum rate necessary to prevent the reaction product from backing up into the inlet air tube. The reaction product was cooled and charged to a distillation zone where it was distilled under reduced pressure (about 10 mm. of mercury absolute pressure). The residue remaining in the distillation zone, after a pot temperature of 100° C. had been reached at the aforementioned pressure, contained carboxylic acid product. The acid was separated from the catalyst by extracting the residue with a mixture of chloroform and water and recovering the acid from the former solvent. The conditions of the reactions, together with the products obtained, are set forth in Table I.

Table I.—Liquid Phase Oxidation of Orthoxylene

| Run No. | 1 | 2 |
|---|---|---|
| Materials Charged to Reactor, Grams: | | |
| Ortho-Xylene | 22.0 | 22.2 |
| Acetic acid | 100.1 | 101.2 |
| Cobalt diacetate ·4H$_2$O | 7.2 | 6.1 |
| HBr (42% aqueous solution) | 7.6 | None |
| Perfluorobutyric acid | None | 5.2 |
| Conditions: | | |
| Reaction Time, Hrs | 43 | 53 |
| Pressure, p.s.i.g. | 0 | 0 |
| Liquid Temperature Range, ° C | 105-109 | 109-112 |
| Xylene Conversion, percent | 91 | 50 |
| Product: | | |
| Ortho-Toluic acid, Wt. percent | 37 | 79 |
| Phthalide, Wt. percent | 54 | 16 |
| Yield: | | |
| Mole percent of ortho-toluic acid (based on ortho-xylene) | 29 | 34 |

The data show that under these conditions perfluorobutyric acid has a selective effect on the oxidation reaction which results in the formation of greater proportions of monobasic acid than where hydrogen bromide is used in combination with glacial acetic acid. This surprising effect is also obtained in the liquid phase oxidation of paraxylene.

EXAMPLE 2

When the above experiments were carried out for a period of 50 hours except in the absence of both hydrobromic acid and perfluoroacid the xylene conversion was only 18%. The major product was ortho-toluic acid. This illustrates the catalytic effect of the perfluoroacid which promotes the formation of the aforementioned monobasic acid.

EXAMPLE 3

A quantity of ortho-xylene (30 grams) was dissolved in 100 grams of glacial acetic acid containing 6.3 grams of cobalt diacetate, 1.7 grams of aqueous hydrobromic acid (as a 40 wt. percent solution), and 4.6 grams of perfluorobutyric acid. The solution was heated at atmospheric pressure to its boiling point and air was blown in (at a rate of 10 liters per hour) for a period of 13 hours. It was noted that the reaction temperature ranged from 108 to 111° C. Under these conditions, the xylene conversion was 95% and the products consisted of orthotoluic acid (40%), phthalide (13%), and liquid organic material (47%). The liquid organic material was composed of a mixture of ortho-tolualdehyde and an ester (probably the acetate of ortho-hydroxymethyl toluene).

This experiment demonstrates the unusual products obtained with a combination of hydrobromic acid and a perfluoroacid.

EXAMPLE 4

The procedure described in Example 1 was repeated except that the materials and conditions differed according to the data given in Table II.

*Table II.—Liquid Phase Oxidation of Para-Xylene*

| Run No. | 3 | 4 | 5 | 6 |
|---|---|---|---|---|
| Materials Charged to Reactor, Grams: | | | | |
| Para-Xylene | 24.6 | 21.8 | 27.1 | 30 |
| Acetic acid | 104.9 | 103.2 | 100.8 | 100 |
| Cobalt diacetate·4H₂O | 5.5 | 6.7 | 6.3 | 6.3 |
| HBr (42% aqueous solution) | 4.6 | | | 1.7 |
| Perfluorobutyric acid | | 4.7 | | 4.6 |
| KEL-F acid 633 | | | 5.7 | |
| Conditions: | | | | |
| Reaction Time, Hours | 13.5 | 48 | 12 | 12 |
| Pressure, p.s.i.g. | 0 | 0 | 0 | 0 |
| Liquid Temp. Range, °C. | 104–112 | 109–115 | 112–113 | 109–113 |
| Product: | | | | |
| Para-Toluic acid, Wt. percent | 55 | 90 | 90 | 90 |
| Para-Toluadehyde | 45 | | | |
| Terephthalic acid | | 3 | | |

The results in Table II show the surprising effect produced by the perhalogenated acids of the present invention on the formation of monobasic acids. In Run 3 the product contained only 55 wt. percent para-toluic acid while under similar conditions the addition of a small amount of either perfluorobutyric acid or Kel-F acid 633 resulted almost in the exclusive formation of para-toluic acid. It is important to note that there was no ionic bromine used in Runs 4 and 5.

EXAMPLE 5

A quantity (22 grams) of para-xylene was dissolved in 100 grams of glacial acetic acid containing 6 grams of perfluorobutyric acid and 6.5 grams of cobalt acetate. The mixture was placed in a glass-lined autoclave, heated to its boiling point (150–155° C.) under a pressure of 50 p.s.i.g. Air under pressure was then blown through the mixture at a rate of 10 liters per hour for a period of 51 hours. During the reaction, 9 grams of unreacted p-xylene was recovered from the exit gas; the rest of the p-xylene (13 grams) was converted to oxygenated products. The resulting product consisted of a mixture of solid acids totaling 18 grams and consisted of terephthalic acid (30%), para-toluic acid (50%) and terephthaldehydic acid (20%). A trace of para-tolualdehyde was also present. This experiment illustrates the effect of higher temperatures and pressures on the oxidation reaction.

EXAMPLE 6

A quantity of para-xylene (30 grams) was dissolved in 100 grams of glacial acetic acid containing 4.6 grams of perfluorobutyric acid, 1.7 grams of hydrobromic acid (as a 40% aqueous solution), and 6.3 grams of cobalt diacetate. The solution was heated to its boiling point and air was blown into the boiling solution at a rate of 10 liters per hour. The reaction temperature varied from about 110 to 113° C. and the pressure was atmospheric. After allowing the reaction to proceed for 12 hours, it was discontinued. The xylene conversion was 88%. The product consisted of para-toluic acid (75%), terephthalic acid (15%), para-hydroxymethylbenzoic acid (trace), para-tolualdehyde (10%) and some terephthaldehydic acid. This experiment domonstrates that the use of a combination of ionic bromine and a perfluoroacid not only increases the rate of reaction, but leads to the formation of different products.

EXAMPLE 7

A quantity (23.4 grams) of para-xylene was dissolved in 101 grams of glacial acetic acid containing 6.8 grams of cobalt acetate and 6.6 grams of perfluorobutyric acid. The resulting solution was placed in a glass-lined autoclave and heated to its boiling point under a pressure of 50 p.s.i.g. Air was blown into the reaction mixture for a period of 54 hours at the rate of 10 liters per hour. The reaction temperature was about 153° C. During the progress of the experiment, 5.2 grams of unreacted xylene was carried out of the reaction vessel with the excess air; the remainder of the para-xylene reacted. The products of the reaction consisted of 14.6 grams of solid acids (terephthalic acid, para-toluic acid, and some terephthaldehydic acid) and 1 gram of para-tolualdehyde.

When this reaction was repeated using aqueous hydrobromic acid (5.4 grams) in place of perfluorobutyric acid at a temperature of about 155° C. for a period of 12 hours, the amount of unreacted xylene recovered was 4 grams and the product consisted of 5.7 grams of solid acids (largely para-toluic acid) and 15.4 grams of para-tolualdehyde. These experiments demonstrate the usefulness of the perfluoroacid in producing acidic products.

When the reaction was again repeated at 155° C. for 6 hours using a mixture of aqueous hydrobromic acid (2.1 grams) and perfluorobutyric acid (4.9 grams), the xylene conversion was 95%. The product consisted of 9.1 grams of solid acids (para-toluic acid and terephthalic acid) and 9.6 grams of para-tolualdehyde.

Resort may be had to various modifications and variations of the present invention without departing from the spirit of the discovery or the scope of the appended claims. For example, other devices for contacting oxygen with the reaction mixture may be used, such as high speed stirrers or packed towers wherein the gas and liquid phases are contacted in the form of thin films.

What is claimed is:

1. A process for making oxygenated aromatic compounds which comprises reacting a polyalkyl substituted benzene with molecular oxygen in the liquid phase in the presence of a catalytic amount of a heavy metal salt, said metal being selected from Groups VIB, VIIB and VIII of the Periodic Chart, an aliphatic perhalogenated acid having a formula selected from the group consisting of:

(a) $X_3C(CX_2)_n COOH$ and (b) $HOOC(CX_2)_n COOH$ wherein $n$ is 1 to 8 and X is selected from the group consisting of fluorine atoms and a mixture of fluorine and chlorine atoms, and a lower aliphatic acid selected from the group consisting of acetic, propionic, and butyric acids at temperatures of about 75 to 200° C. under pressures of 0 to 200 p.s.i.g. for up to 50 hours, said aliphatic perhalogenated acid and said alkyl substituted aromatic compound being present in a weight ratio of about 0.1 to 0.4:1 and said lower aliphatic acid and said alkyl substituted aromatic compound being present in a weight ratio of about 2 to 10:1, and recovering a reaction product containing an oxygenated aromatic compound.

2. Process according to claim 1 in which the alkyl substituted aromatic compound is a polyalkyl substituted benzene.

3. Process according to claim 1 in which the polyalkyl substituted benzene is a dialkyl substituted benzene in which each alkyl group contains 1 to 4 carbon atoms.

4. Process according to claim 1 in which the metal in the heavy metal salt is cobalt.

5. Process according to claim 1 in which the oxygenated aromatic compound in the reaction product is an acid and comprises a major proportion of said reaction product.

6. A process according to claim 1 in which the metal in the heavy metal salt is a Group VIII metal.

7. A process according to claim 1 in which the lower aliphatic acid is glacial acetic acid.

8. A process according to claim 1 in which the perhalogenated acid is perfluorobutyric acid.

9. A process according to claim 1 in which the perhalogenated acid is trichlorooctafluorohexanoic acid.

10. A process according to claim 1 in which the reaction is carried out in the presence of bromine ion.

11. A process for making aromatic carboxylic acids which comprises reacting dialkylbenzene with molecular oxygen at temperatures of 110 to 150° C. and under pressures of atmospheric to 200 p.s.i.g. in the presence of catalytic amount of a cobalt salt about 2 to 10 parts by weight of acetic acid and 0.1 to 0.4 parts by weight of a perhalogenated acid per part by weight of dialkylbenzene, the said perhalogenated acid having a formula selected from the group consisting of:

$$(a)\ X_3C(CX_2)_nCOOH$$

and $$(b)\ HOOC(CX_2)_nCOOH,$$

wherein $n$ is 1 to 8 and X is selected from the group consisting of fluorine atoms and a mixture of fluorine and chlorine atoms, maintaining said temperatures and pressures for a sufficient time to substantially convert said dialkylbenzene to aromatic carboxylic acids.

12. A process according to claim 1 in which the perhalogenated acid is perfluorobutyric acid.

13. A process according to claim 1 in which the perhalogenated acid is trichlorooctafluorohexanoic acid.

14. Process according to claim 11 in which the dialkylbenzene is dimethylbenzene.

References Cited in the file of this patent

UNITED STATES PATENTS

| 2,245,528 | Loder | June 10, 1941 |
| 2,833,816 | Saffer et al. | May 6, 1958 |

FOREIGN PATENTS

| 685,498 | Great Britain | Jan. 7, 1953 |
| 798,619 | Great Britain | July 23, 1958 |
| 810,020 | Great Britain | Mar. 4, 1955 |

OTHER REFERENCES

Kauk et al.: Industrial and Engineering Chemistry, vol. 43, pages 2332–4 (October 1951).